United States Patent
Kumazawa et al.

(10) Patent No.: US 11,608,793 B2
(45) Date of Patent: Mar. 21, 2023

(54) CONTROLLER FOR HYBRID ELECTRIC VEHICLE AND METHOD FOR CONTROLLING HYBRID ELECTRIC VEHICLE

(71) Applicant: TOYOTA JIDOSHA KABUSHIKI KAISHA, Toyota (JP)

(72) Inventors: Suguru Kumazawa, Nisshin (JP); Koichiro Muta, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/657,668

(22) Filed: Apr. 1, 2022

(65) Prior Publication Data
US 2022/0333542 A1 Oct. 20, 2022

(30) Foreign Application Priority Data

Apr. 19, 2021 (JP) .............................. JP2021-070396
Feb. 1, 2022 (JP) .............................. JP2022-014452

(51) Int. Cl.
F02D 41/12 (2006.01)
B60W 20/40 (2016.01)
F01N 13/00 (2010.01)

(52) U.S. Cl.
CPC ............ F02D 41/123 (2013.01); B60W 20/40 (2013.01); F01N 13/002 (2013.01); F01N 2560/05 (2013.01)

(58) Field of Classification Search
CPC ...... F02D 41/123; B60W 20/40; F01N 13/002; F01N 2560/05
See application file for complete search history.

(56) References Cited

U.S. PATENT DOCUMENTS

2015/0369153 A1* 12/2015 Tsunooka .................. F01N 3/10
  60/285
2018/0216552 A1* 8/2018 Yokoi .................... F01N 3/0842

FOREIGN PATENT DOCUMENTS

JP    2017-177823 A    10/2017

* cited by examiner

*Primary Examiner* — Grant Moubry
*Assistant Examiner* — Ruben Picon-Feliciano
(74) *Attorney, Agent, or Firm* — Oblon, McClelland, Maier & Neustadt, L.L.P.

(57) ABSTRACT

A controller for a hybrid electric vehicle including an internal combustion engine is provided. The internal combustion engine includes a filter arranged in an exhaust passage collect particulate matter from exhaust gas. The controller executes a first deceleration control process, a second deceleration control process, and a selection process. The first deceleration control process uses a fuel cutoff process when deceleration of the hybrid electric vehicle is required. The second deceleration control process does not use the fuel cutoff process when deceleration of the hybrid electric vehicle is required. The selection process selects execution of the second deceleration control process when a PM deposition amount is greater than or equal to a threshold value and selects execution of the first deceleration control process when the PM deposition amount is less than the threshold value.

7 Claims, 6 Drawing Sheets

CONTROLLER FOR HYBRID ELECTRIC VEHICLE AND METHOD FOR CONTROLLING HYBRID ELECTRIC VEHICLE

BACKGROUND

1. Field

The following description relates to a controller for a hybrid electric vehicle and a method for controlling a hybrid electric vehicle.

2. Description of Related Art

Japanese Laid-Open Patent Publication No. 2017-177823 discloses an example of an internal combustion engine in which an exhaust passage includes a filter that collects particulate matter (PM) from exhaust gas. A controller that controls the internal combustion engine reduces the opening degree of a throttle valve when the temperature of the filter is high during a fuel cutoff process. This reduces the amount of oxygen supplied to the filter so that the temperature of the filter does not increase.

When the fuel cutoff process is performed to reduce the speed of a vehicle, the opening degree of the throttle valve is small. Thus, there is a limit to further decreasing the opening degree of the throttle valve.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects and advantages of the present description will now be described below.

Aspect 1

A controller for a hybrid electric vehicle according to one aspect of the present description includes an internal combustion engine and a rotating electrical machine. The internal combustion engine includes a filter arranged in an exhaust passage and configured to collect particulate matter from exhaust gas, the controller includes processing circuitry. The processing circuitry is configured to execute a first deceleration control process, a second deceleration control process, and a selection process. The first deceleration control process uses a fuel cutoff process when deceleration of the hybrid electric vehicle is required. The fuel cutoff process stops combustion control of fuel in a cylinder of the internal combustion engine. The second deceleration control process does not use the fuel cutoff process when deceleration of the hybrid electric vehicle is required. The selection process selects execution of the second deceleration control process when a particulate matter (PM) deposition amount is greater than or equal to a threshold value and selects execution of the first deceleration control process when the PM deposition amount is less than the threshold value. The PM deposition amount is an amount of particulate matter deposited on the filter.

When the PM deposition amount is large, oxygen entering the filter tends to increase the oxidization amount of particulate matter. Thus, when the PM deposition amount is large and the fuel cutoff process is performed, the temperature of the filter may become excessively high. With the above configuration, when the PM deposition amount is greater than or equal to the threshold value, the deceleration of the hybrid electric vehicle is required without using the fuel cutoff process. Thus, the temperature of the filter will not increase excessively.

Aspect 2

The controller according to another aspect of the present description, where the selection process may include a process that variably sets the threshold value in accordance with a temperature of the filter, and the threshold value that is set when the temperature of the filter is high may be less than or equal to the threshold value that is set when the temperature of the filter is low.

When the temperature of the filter is high, the fuel cutoff process tends to increase the temperature of the filter beyond a permissible range. With the above configuration, the threshold value is set in accordance with the temperature of the filter to preferably execute the first deceleration control process as much as possible and restrict an excessive increase in the temperature of the filter.

Aspect 3

The controller according another aspect of the present description, where the hybrid electric vehicle may include a gear ratio adjuster and an electric storage device, a crankshaft of the internal combustion engine may be configured to be mechanically coupled to a drive wheel by the gear ratio adjuster, the gear ratio adjuster may be configured to adjust a ratio of a rotation speed of the crankshaft to a rotation speed of the drive wheel, the electric storage device may be configured to be charged with regenerative power of the rotating electrical machine, the second deceleration control process may include a process that sets the regenerative power and an engine speed in accordance with a state of charge of the electric storage device, the regenerative power that is set when the state of charge of the electric storage device is large may be less than or equal to the regenerative power that is set when the state of charge is small, and the engine speed that is set when the state of charge of the electric storage device is large may be greater than or equal to the engine speed that is set when the state of charge is small.

To achieve the same deceleration, when regenerative power is small, the rotation speed of the internal combustion engine needs to be higher than when the regenerative power is large. With the above configuration, the engine speed that is set when the regenerative power is small is greater than or equal to the engine speed that is set when the regenerative power is large. This limits fluctuation of the deceleration force that would result from differences in the regenerative power. Further, when the PM deposition amount is greater than or equal to a threshold value, the second deceleration control process is executed regardless of the state of charge. This limits fluctuation of the deceleration force that would result from differences in the state of charge.

Aspect 4

The controller according to another aspect of the present description, where the processing circuitry may be configured to execute a notification process, and the notification process may notify a user that deceleration will be restricted to a small extent prior to execution of the second deceleration control process.

With the above configuration, the notification process is executed to allow the user to notice that deceleration will be restricted to a small extent.

Aspect 5

The controller according to another aspect of the present description, where the processing circuitry may be configured to execute a gradating process, and when the PM deposition amount is greater than or equal to the threshold value during execution of the first deceleration control process, before switching to the second deceleration control process, the gradating process in the first deceleration control process may gradually shift deceleration that is achievable in the second deceleration control process.

With the above configuration, deceleration is gradually changed when the first deceleration control process shifts to the second deceleration control process. Thus, the user will be prepared for the behavior of a hybrid electric vehicle.

Aspect 6

The controller according to another aspect of the present description, where the processing circuitry may be configured to execute the second deceleration control process when deceleration of the hybrid electric vehicle is required even when the PM deposition amount is less than the threshold value if there is a history of the second deceleration control process having been executed in a single trip.

With the above configuration, once the second deceleration control process is executed, the second deceleration control process will be selected even when the PM deposition amount becomes less than the threshold value during the trip. This restricts frequent changes in deceleration of the hybrid electric vehicle.

Aspect 7

A method for controlling a hybrid electric vehicle according to one aspect of the present description includes an internal combustion engine and a rotating electrical machine. The internal combustion engine includes a filter arranged in an exhaust passage and configured to collect particulate matter from exhaust gas. The method includes executing a first deceleration control process, a second deceleration control process, and a selection process. The first deceleration control process uses a fuel cutoff process when deceleration of the hybrid electric vehicle is required. The fuel cutoff process stops combustion control of fuel in a cylinder of the internal combustion engine. The second deceleration control process does not use the fuel cutoff process when deceleration of the hybrid electric vehicle is required. The selection process selects execution of the second deceleration control process when a particulate matter (PM) deposition amount is greater than or equal to a threshold value and selects execution of the first deceleration control process when the PM deposition amount is less than the threshold value. The PM deposition amount is an amount of particulate matter deposited on the filter.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A first embodiment will now be described with reference to the drawings.

Basic Structure

Figure 1:
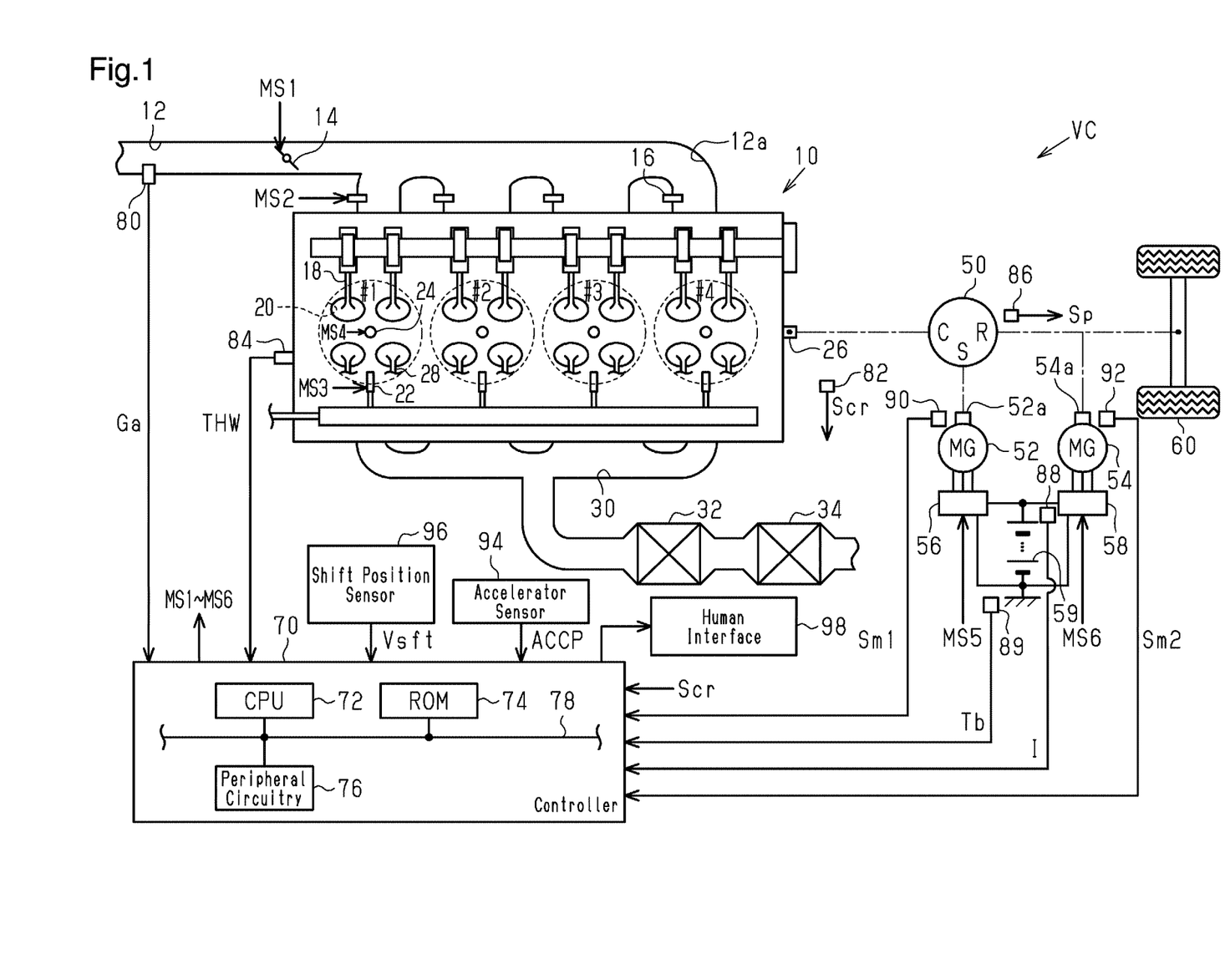
FIG. 1 is a diagram showing the structure of a vehicle according to a first embodiment.

As shown in FIG. 1, an internal combustion engine 10 includes four cylinders #1 to #4. The internal combustion engine 10 includes an intake passage 12 in which a throttle valve 14 is arranged. The downstream portion of the intake passage 12 includes intake ports 12a. Each intake port 12a includes a port injection valve 16 that injects fuel into the intake port 12a. The air drawn into the intake passage 12 and the fuel injected from the port injection valves 16 enter combustion chambers 20 when intake valves 18 open. Each combustion chamber 20 includes a direct injection valve 22 that injects fuel into the combustion chamber 20. The mixture of air and fuel in the combustion chamber 20 is burned by a spark discharge of an ignition device 24. The generated combustion energy is converted into rotational energy of a crankshaft 26.

The burned air-fuel mixture is discharged from the combustion chamber 20 into an exhaust passage 30 as exhaust gas when an exhaust valve 28 opens. The exhaust passage 30 includes a three-way catalyst 32 that has an oxygen storage capacity and a gasoline particulate filter (GPF) 34. The GPF 34 includes a three-way catalyst carried in a filter that collects PM.

The crankshaft 26 is mechanically connected to a carrier C of a planetary gear mechanism 50 that forms a power split mechanism. A sun gear S of the planetary gear mechanism 50 is mechanically connected to a rotary shaft 52a of a first motor generator 52. A ring gear R of the planetary gear mechanism 50 is mechanically connected to a rotary shaft 54a of a second motor generator 54 and drive wheels 60. A first inverter 56 applies alternating voltage to a terminal of the first motor generator 52. A second inverter 58 applies alternating voltage to a terminal of the second motor generator 54. The first inverter 56 and the second inverter 58 are power conversion circuits that convert a terminal voltage of a battery 59, which serves as a direct voltage source, into an alternating voltage.

The controller 70 controls the internal combustion engine 10 as a control subject. The controller 70 operates operation units of the internal combustion engine 10 such as the throttle valve 14, the port injection valves 16, the direct injection valves 22, the ignition devices 24, and the like to control torque, a ratio of exhaust gas components, and the like as control quantities of the control subject. The controller 70 operates the first inverter 56 to control the torque, which is a control quantity of the first motor generator 52, which is a control subject. The controller 70 operates the second inverter 58 to control the torque, which is a control quantity of the second motor generator 54, which is a control subject. FIG. 1 shows operation signals MS1 to MS6 of the throttle valve 14, the port injection valves 16, the direct injection valves 22, the ignition devices 24, the first inverter 56, and the second inverter 58, respectively. The controller 70 refers to an intake air amount Ga detected by the air flowmeter 80 and an output signal Scr of a crank angle sensor 82 to control a control quantity of the internal combustion engine 10. The controller 70 refers to a coolant temperature THW detected by a coolant temperature sensor 84 and an output signal Sp of an output rotation angle sensor 86 that detects the rotation angle of the ring gear R. The controller 70 refers to a charge-discharge current I of the battery 59 detected by a current sensor 88. The controller 70 refers to a temperature Tb of the battery 59 detected by a temperature sensor 89. The controller 70 refers to an output signal Sm1 of a first rotation angle sensor 90 that detects the rotation angle of the first motor generator 52 to control a control quantity of the first motor generator 52. The controller 70 refers to an output signal Sm2 of a second rotation angle sensor 92 that detects the rotation angle of the second motor generator 54 to control a control quantity of the second motor generator 54. The controller 70 refers to an accelerator operation amount ACCP, which is the depression amount of an accelerator pedal detected by an accelerator sensor 94, and a shift variable Vsft detected by a shift position sensor 96. The shift variable Vsft represents a shift position such as the D-position, the B-position, the P-position, the N-position, and the like.

The controller 70 includes a CPU 72, a ROM 74, and peripheral circuitry 76, which are allowed to communicate with one another through a communication line 78. The peripheral circuitry 76 includes a circuit that generates clock signals for synchronizing internal operations, a power supply circuit, a reset circuit, and the like. The controller 70 controls control quantities when the CPU 72 executes a program stored in the ROM 74.

Processes Related to Protection of GPF 34

Figure 2:
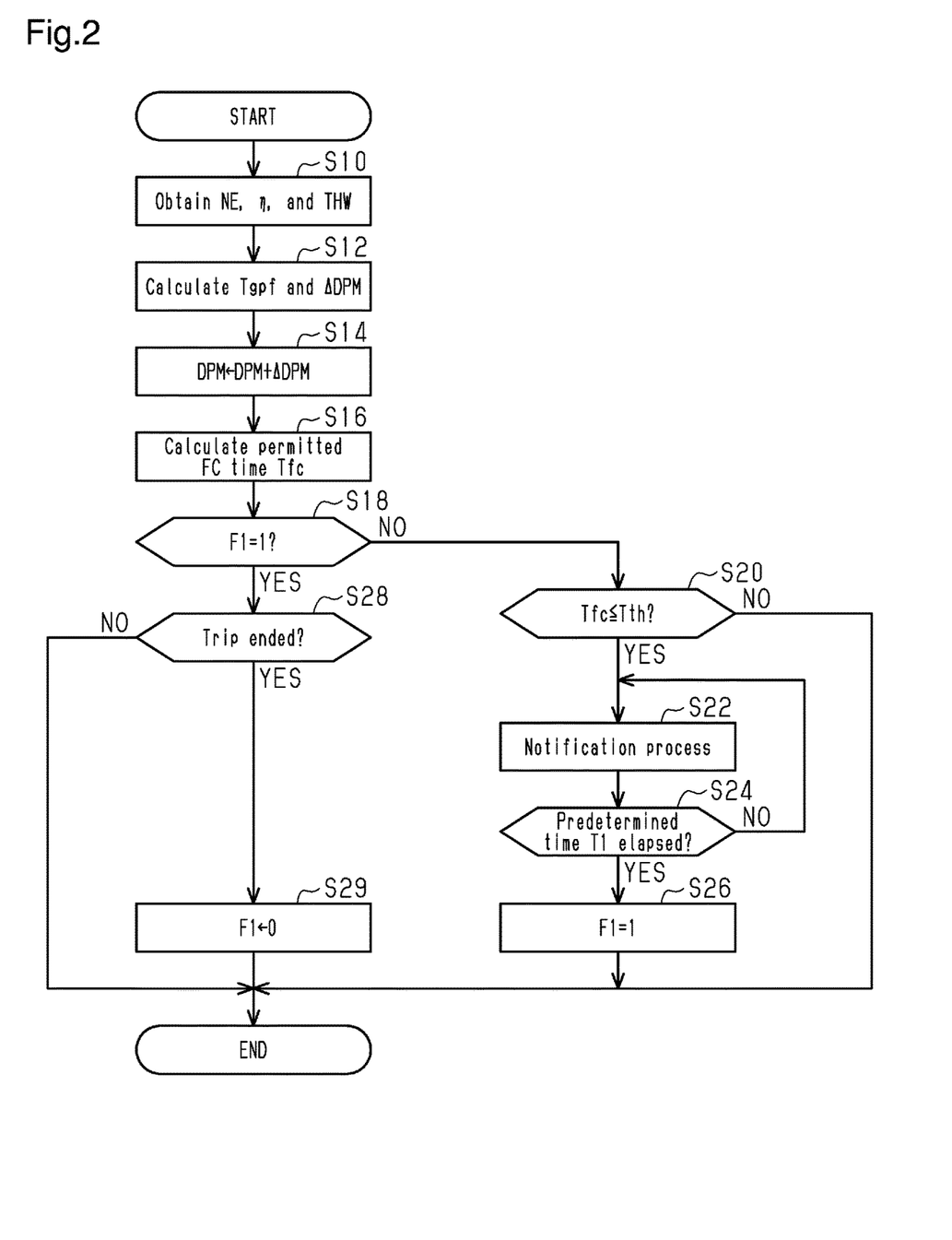
FIG. 2 is a flowchart showing the procedure of processes executed by a controller of the first embodiment.

FIG. 2 shows the procedure of processes related to the protection of the GPF 34. The CPU 72 repeatedly executes the program stored in the ROM 74 in, for example, predetermined cycles to perform the processing illustrated in FIG. 2. In the following description, the step number of each process starts with the letter "S."

In the series of processes shown in FIG. 2, the CPU 72 obtains an engine speed NE, a charging efficiency η, and the coolant temperature THW (S10). The engine speed NE is calculated by the CPU 72 from the output signal Scr. The charging efficiency η is calculated by the CPU 72 from the intake air amount Ga and the engine speed NE. Then, the CPU 72 calculates a temperature Tgpf of the GPF 34 and a newly accumulated amount ΔDPM of a PM deposition amount DPM from the engine speed NE, the charging efficiency η, and the coolant temperature THW (S12). The PM deposition amount DPM is the amount of PM collected by the GPF 34. Specifically, the CPU 72 calculates the amount of PM in the exhaust gas discharged into the exhaust passage 30 from the engine speed NE, the charging efficiency η, and the coolant temperature THW. The CPU 72 calculates the temperature Tgpf of the GPF 34 from the engine speed NE and the charging efficiency η. The CPU 72 calculates the newly accumulated amount ΔDPM from the amount of PM in exhaust gas and the temperature Tgpf of the GPF 34. The CPU 72 substitutes a value obtained by adding the newly accumulated amount ΔDPM to the PM deposition amount DPM for the PM deposition amount DPM (S14).

The CPU 72 uses the PM deposition amount DPM and the temperature Tgpf as inputs to calculate a permitted FC time Tfc during which a fuel cutoff process can be continuously performed (S16). The permitted FC time Tfc is an upper limit time during which the temperature Tgpf of the GPF 34 will not become excessively high. In a state in which the ROM 74 stores, in advance, map data of which input variables are the PM deposition amount DPM and the temperature Tgpf and output variable is the permitted FC time Tfc, the CPU 72 calculates the permitted FC time Tfc through map calculation.

Figure 3:
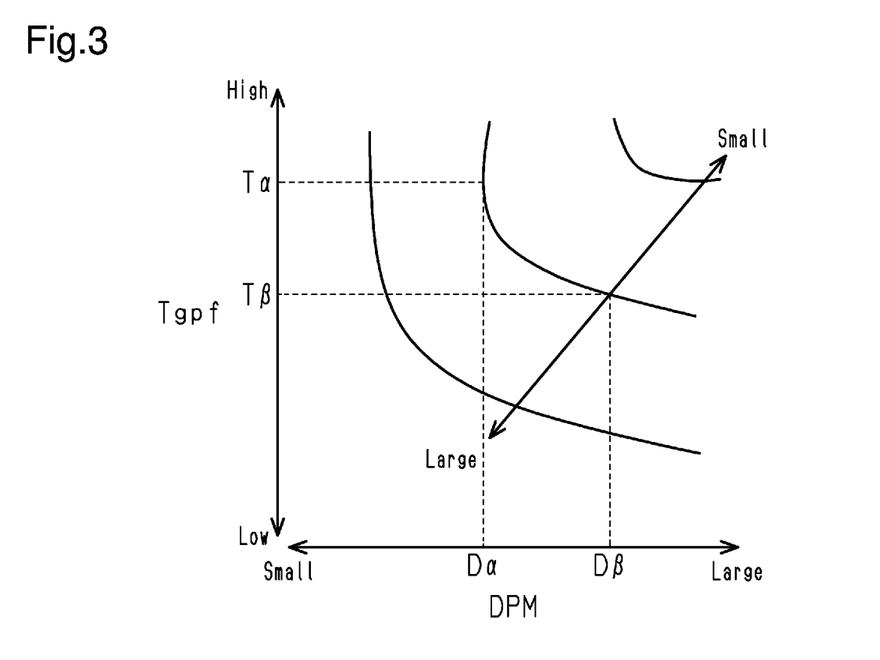
FIG. 3 is a diagram showing the tendency of map data of the first embodiment.

FIG. 3 shows an example of the map data.

As shown in FIG. 3, the permitted FC time Tfc when the PM deposition amount DPM is large is less than or equal to the permitted FC time Tfc when the PM deposition amount DPM is small. This is because an increase in the PM deposition amount DPM increases the oxidization amount of PM per unit time when oxygen enters the GPF 34. The permitted FC time Tfc when the temperature Tgpf is high is less than or equal to the permitted FC time Tfc when the temperature Tgpf is low. This is because higher temperature Tgpf shortens the time for the temperature Tgpf to reach the upper limit value.

The map data includes sets of data, with each set including a discrete value of an input variable and a corresponding output variable. When the value of an input variable matches one of the values of input variables in the map data, the map calculation may use the value of the corresponding output variable in the map data as the calculation result. When the value of the input variable does not match any of the values of the input variables in the map data, the map calculation may use a value obtained by interpolating multiple values of the output variables included in the map data as the calculation result. Alternatively, when the value of the input variable does not match any of the values of the input variables in the map data, the map calculation may use the value of a corresponding output variable in the map data that is the closest among the values of the output variables included in the map data as the calculation result.

Referring to FIG. 2, the CPU 72 determines whether a protection flag F1 is 1 (S18). The protection flag F1 is 1 when a process that protects the GPF 34 from overheating is executed. The protection flag F1 is 0 when the process that protects the GPF 34 from overheating is not executed.

When determining that the protection flag F1 is 0 (S18: NO), the CPU 72 determines whether the permitted FC time Tfc is less than or equal to a threshold value Tth (S20). This process determines whether to change a required drive torque Tp* when the accelerator operation amount ACCP is less than or equal to a predetermined value. The threshold value Tth is set in accordance with an average duration where the required drive torque Tp* is negative. For example, the threshold value Tth may be set to 5 s or less.

The process of S20 is equivalent to a process that determines whether the PM deposition amount DPM is greater than or equal to a threshold value. The threshold value is set in accordance with the temperature Tgpf. Specifically, FIG. 3 shows a threshold value Dα of the PM deposition amount DPM when the temperature Tgpf is temperature Tα and a threshold value Dβ of the PM deposition amount DPM when the temperature Tgpf is temperature Tβ. As shown in FIG. 3, the threshold value Dα when the temperature Tgpf is the temperature Tα is less than the threshold value Dβ when the temperature Tgpf is the temperature Tβ that is lower than the temperature Tα.

Referring to FIG. 2, when determining that the permitted FC time Tfc is less than or equal to the threshold value Tth (S20: YES), the CPU 72 notifies the user that deceleration will be changed by operating a human interface 98 shown in FIG. 1 (S22). When the human interface 98 is, for example, a warning lamp, the process may illuminate the warning lamp. The meaning of the illumination is described in a manual of a vehicle VC. The human interface 98 is not limited to a device that outputs visual information. Instead, the human interface 98 may be a loudspeaker. In this case, the loudspeaker may output voice information, for example, "entering protection mode for GPF 34."

Then, the CPU 72 waits for a predetermined time T1 of a predetermined length to elapse from when the process of S22 is executed (S24: NO). When the CPU 72 determines that the predetermined time T1 has elapsed (S24: YES), the CPU 72 sets the protection flag F1 to 1 (S26).

When determining that the protection flag F1 is 1 (S18: YES), the CPU 72 determines whether a trip has ended (S28). The trip refers to a period during which a traveling permission switch for the vehicle is turned on. The traveling permission switch may be a switch that opens and closes the electric path of the battery 59, the first inverter 56, and the second inverter 58.

When determining that the trip has ended (S28: YES), the CPU 72 sets the protection flag F1 to 0 (S29).

The CPU 72 ends the processing illustrated in FIG. 2 when completing the process of S26 or S29 or when making a negative determination in the process of S20 or S28.

Processes Related to Control of Motor Generator

Figure 4:
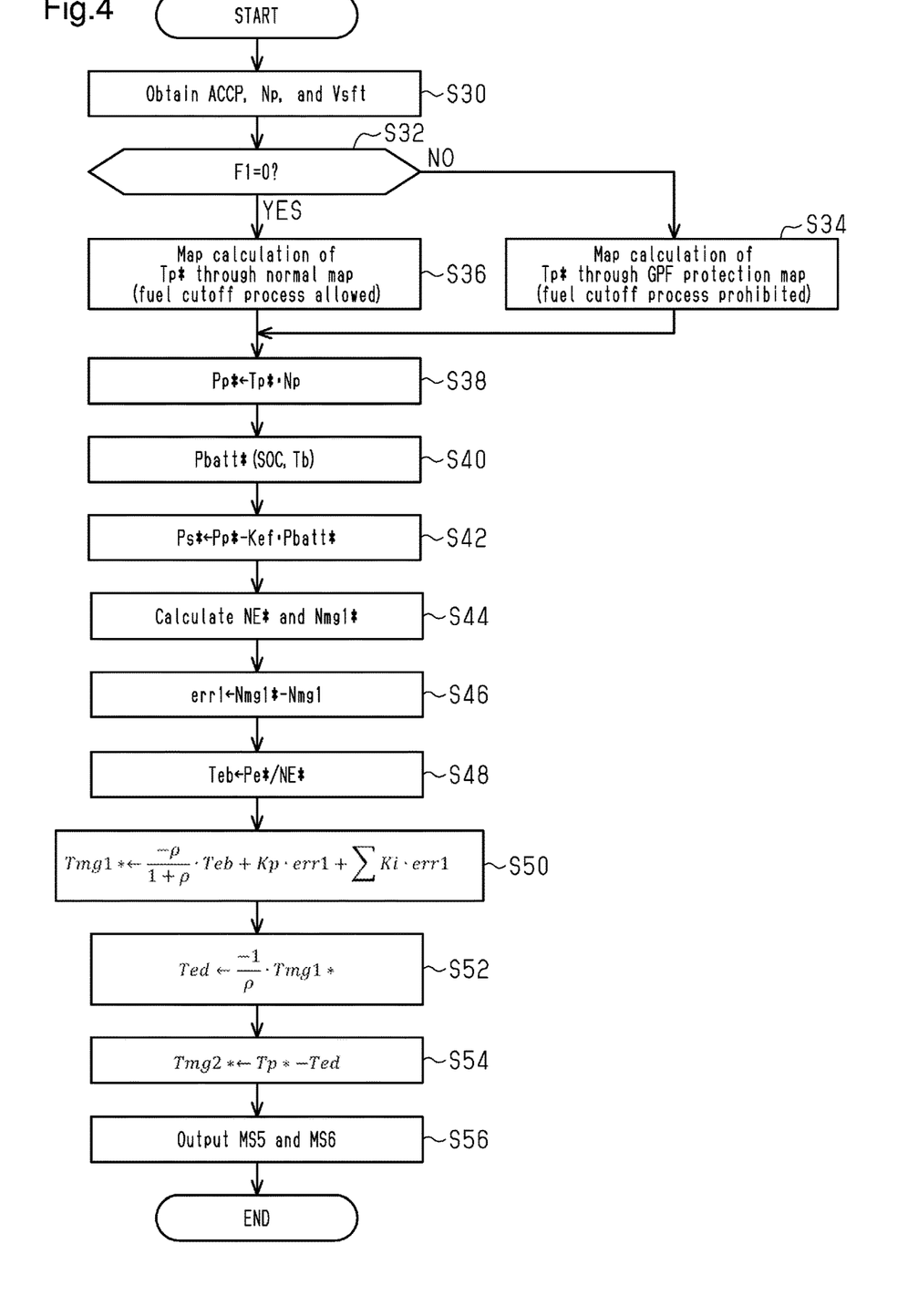
FIG. 4 is a flowchart showing the procedure of processes executed by the controller of the first embodiment.

FIG. 4 shows the procedure of processes related to control of the output of the first motor generator 52 and the second motor generator 54. The CPU 72 repeatedly executes the program stored in the ROM 74 in, for example, predetermined cycles to perform the processing illustrated in FIG. 4.

In the series of processes shown in FIG. 4, the CPU 72 obtains the accelerator operation amount ACCP, an output rotation speed Np, and the shift variable Vsft (S30). The output rotation speed Np indicates the rotation speed of the ring gear R of the planetary gear mechanism 50. The output rotation speed Np is a variable that represents the rotation speed of the drive wheels 60. In other words, the output rotation speed Np is a variable that represents the vehicle speed. The output rotation speed Np is calculated by the CPU 72 from the output signal Sp.

The CPU 72 determines whether the protection flag F1 is 0 (S32). When determining that the protection flag F1 is 0 (S32: YES), the CPU 72 uses a normal map to calculate the required drive torque Tp* that is torque required for the drive wheels 60 (S36). In the map data of the normal map, the required drive torque Tp* when the accelerator operation amount ACCP is less than or equal to a predetermined value is set to an achievable value when a fuel cutoff process is executed. In this case, an achievable value when the fuel cutoff process is executed is a value that can be achieved when a fuel cutoff process is executed regardless of the state of charge SOC. In other words, this is a value that can be achieved without performing regenerative control on the second motor generator 54. The minimum value of the required drive torque Tp* in the B-position may be set in accordance with the output of the internal combustion engine 10 that is achievable when a fuel cutoff process is executed and the engine speed NE is the maximum rotation speed.

When determining that the protection flag F1 is 1 (S32: NO), the CPU 72 uses a protection map to calculate the required drive torque Tp*, which is the torque required for the drive wheels 60 (S34). The map data of the protection map sets values that can be achieved for the load torque of the internal combustion engine 10 when the accelerator operation amount ACCP is less than or equal to the predetermined value without executing the fuel cutoff process are set to the required drive torque Tp*. In this case, a value that can be achieved for the load torque of the internal combustion engine 10 without executing the fuel cutoff process is a value that is achievable regardless of the state of charge SOC. The required drive torque Tp* in this case is a value that is achievable with the minimum charging efficiency η that stabilizes combustion in the internal combustion engine 10 when the engine speed NE is as high as possible. Specifically, in the D-position, the required drive torque Tp* is a value that is achievable with the minimum charging efficiency η that stabilizes combustion in the internal combustion engine 10 when the engine speed NE is lower, by a certain amount, than the maximum value. In the B-position, the required drive torque Tp* is a value that is achievable with the minimum charging efficiency η that stabilizes combustion in the internal combustion engine 10 when the engine speed NE is the maximum value. Preferably, the CPU 72 controls the air-fuel ratio of the air-fuel mixture in the combustion chamber 20 at the stoichiometric air-fuel ratio. This will substantially cancel out the amount of oxygen entering the GPF 34.

When completing the process of S34 or S36, the CPU 72 substitutes the product of the required drive torque Tp* and the output rotation speed Np for a traveling output Pp* (S38). The CPU 72 calculates a required charge-discharge power Pbatt* for the battery 59 from the state of charge SOC of the battery 59 and a temperature Tb of the battery 59 (S40). The required charge-discharge power Pbatt* is positive when discharging is performed. Specifically, when the state of charge SOC is less than or equal to a predetermined value, the CPU 72 sets a negative required charge-discharge power Pbatt* to charge the battery 59. The state of charge SOC is calculated by the CPU 72 from the charge-discharge current I.

The CPU 72 substitutes a value obtained by subtracting the product of the required charge-discharge power Pbatt* and a conversion efficiency Kef from the traveling output Pp* for a system output Ps* (S42).

Then, the CPU 72 calculates a target engine speed NE* and a target first rotation speed Nmg1* (S44). The target engine speed NE* represents a target value for the engine speed NE. The target first rotation speed Nmg1* represents a target value for a first rotation speed Nmg1 that is the rotation speed of the rotary shaft 52a of the first motor generator 52. The process of S44 will now be described.

The CPU 72 sets a required engine output Pe* in accordance with the system output Ps*. The CPU 72 may substitute the system output Ps* for the required engine output Pe*. Alternatively, the CPU 72 may substitute a value obtained by adding the operation amount for controlling charge-discharge power Pbatt at the required charge-discharge power Pbatt* to the system output Ps* for the required engine output Pe*. The CPU 72 calculates the target engine speed NE* from the required engine output Pe*. In this case, the CPU 72 uses map data stored in the ROM 74 to perform map calculation on the target engine speed NE*. In the map data, the required engine output Pe* is an input variable and the target engine speed NE* is an output variable.

The CPU 72 calculates the target first rotation speed Nmg1* based on the following equation.

$$NE^* = \{\rho/(1+\rho)\}Nmg1^* + \{1/(1+\rho)\} \cdot Np$$

The planetary gear ratio $\rho$ in the above equation is obtained by dividing the number of teeth of the sun gear S by the number of teeth of the ring gear R.

The CPU 72 substitutes a value obtained by subtracting the first rotation speed Nmg1 from the target first rotation speed Nmg1* for an error err1 (S46). The first rotation speed Nmg1 is calculated by the CPU 72 from the output signal Sm1.

The CPU 72 substitutes a value obtained by dividing the required engine output Pe* by the target engine speed NE* for an engine torque base value Teb (S48).

The CPU 72 calculates a required first torque Tmg1* (S50). The requested first torque Tmg1* is torque required for the first motor generator 52. The CPU 72 sets the required first torque Tmg1* as the sum of an open-loop term and a feedback term. The open-loop term is expressed by $\{-\rho/(1+\rho)\} \cdot Teb$, where $-\rho/(1+\rho)$ is a coefficient that converts the torque of the carrier C into the torque of the sun gear S. The feedback term is the operation amount for performing feedback control on the first rotation speed Nmg1. The feedback term is the sum of an output value of a proportional element and an output value of an integral element. The output value of the proportional element is a value obtained by multiplying the error err1 by a proportional gain Kp. The output value of the integral element is an integrated value of values obtained by multiplying the error err1 by an integral gain Ki.

The CPU 72 substitutes a value obtained by multiplying $(-1)/\rho$ by the required first torque Tmg1* for a direct torque Ted (S52). In this case, $(-1)/\rho$ is a coefficient that converts the torque of the sun gear S into the torque of the ring gear R. The direct torque Ted is a calculated torque expected to be applied to the ring gear R.

The CPU 72 calculates a required second torque Tmg2* by subtracting the direct torque Ted from the required drive torque Tp* (S54). The value obtained by subtracting the direct torque Ted from the required drive torque Tp* is equal to the lacking output of the ring gear R for the torque of the drive wheels 60 to become equal to the required drive torque Tp*.

The CPU 72 outputs an operation signal MS5 to the first inverter 56 and an operation signal MS6 to the second inverter 58 (S56). Specifically, the CPU 72 operates the first inverter 56 to control the torque of the first motor generator 52 at the required first torque Tmg1*. The CPU 72 also operates the second inverter 58 to control the torque of the second motor generator 54 at the required second torque Tmg2*.

The CPU 72 ends the processing illustrated in FIG. 4 when completing the process of S56.

Operation Process of Throttle Valve 14

Figure 5:
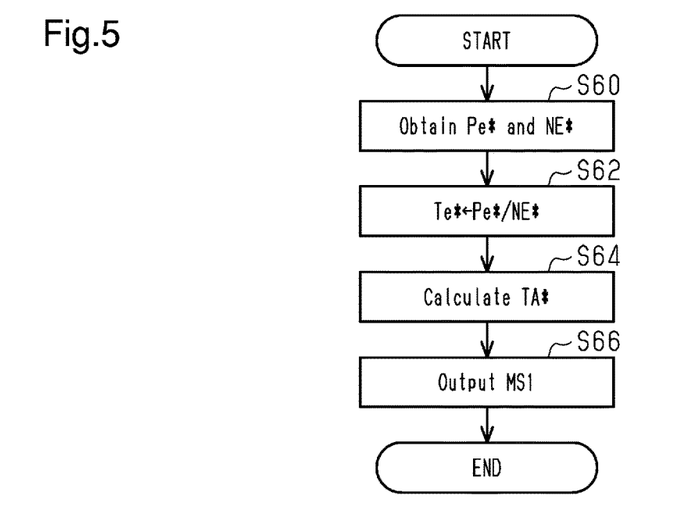
FIG. 5 is a flowchart showing the procedure of processes executed by the controller of the first embodiment.

FIG. 5 shows the procedure of the processes related to the operation of the throttle valve 14. The CPU 72 repeatedly executes a program stored in the ROM 74 in, for example, predetermined cycles to perform the processing illustrated in FIG. 5.

In the series of processes shown in FIG. 5, the CPU 72 obtains the required engine output Pe* and the target engine speed NE* (S60). The CPU 72 substitutes a value obtained by dividing the required engine output Pe* by the target engine speed NE* for a required engine torque Te* (S62). The CPU 72 calculates a throttle opening degree instruction value TA* that is an instruction value for the opening degree of the throttle valve 14 from the required engine torque Te* (S64). The throttle opening degree instruction value TA* calculated in this case is a value for controlling the torque of the internal combustion engine 10 at the required engine torque Te*. The CPU 72 outputs an operation signal MS1 to the throttle valve 14 to control the opening degree of the throttle valve 14 in accordance with the throttle opening degree instruction value TA* (S66).

The CPU 72 ends the processing illustrated in FIG. 5 when completing the process of S66.

The Operation and Advantages of the Present Embodiment

The CPU 72 calculates the required drive torque Tp* from the accelerator operation amount ACCP and the output rotation speed Np and operates the first inverter 56, the second inverter 58, and various types of operation units of the internal combustion engine 10. When the accelerator operation amount ACCP is less than or equal to a predetermined amount, the CPU 72 sets the required drive torque Tp* to a negative value. Normally, the CPU 72 sets the required drive torque Tp* to an achievable value when the internal combustion engine 10 executes a fuel cutoff process.

Further, the CPU 72 calculates the PM deposition amount DPM, which is the amount of particulate matter deposited on the GPF 34, and the temperature Tgpf of the GPF 34. The CPU 72 uses these parameters to calculate the permitted FC time Tfc as the upper limit time during which the temperature of the GPF 34 does not exceed a permissible range under the assumption that a fuel cutoff process is continued. When the permitted FC time Tfc is less than or equal to the threshold value Tth, the CPU 72 switches the map data for calculating the required drive torque Tp* to the map data for protecting the GPF 34. In the protection map data, values are set to be achievable with the load torque of the internal combustion engine 10 when the fuel cutoff process is not executed. Thus, even when the CPU 72 cannot achieve the required drive torque Tp* with the power generated by the second motor generator 54, the CPU 72 achieves the required drive torque Tp* with the load torque of the internal combustion engine 10 without performing a fuel cutoff process. Specifically, the CPU 72 generates a negative driving force by reducing the charging efficiency η of the internal combustion engine 10 and controlling the engine speed NE by operating the first inverter 56 in accordance with the accelerator operation amount ACCP. This reduces the oxygen concentration of the fluid entering the GPF 34 so that oxidization of PM in the GPF 34 does not cause the temperature of the GPF 34 to become excessively high.

The present embodiment described above has the following operation and advantages.

(1) the CPU 72 notifies the driver that the protection map data will be selected prior to the selection. This allows the driver to acknowledge that the vehicle will start to decelerate and not behave in accordance with the accelerator operation. Thus, the driver will be prepared for the vehicle deceleration.

(2) The CPU 72 selects the protection map data when the permitted FC time Tfc is less than or equal to the threshold value Tth regardless of the current state of charge SOC. This sets a fixed deceleration when the accelerator is operated regardless of the state of charge SOC.

(3) The CPU 72 sets the engine speed NE in accordance with the state of charge SOC of the battery 59 when reducing the speed of the vehicle VC with the protection map. That is, the system output Ps* is set in accordance with the state of charge SOC in the process of S42. In other words, the required engine output Pe* is set in accordance with the state of charge SOC. The CPU 72 sets the target engine speed NE* in accordance with the required engine output Pe* during the process of S44. Thus, when the system output Ps* is a value that reduces the speed of the vehicle VC, the target engine speed NE* for a larger state of charge SOC is greater than or equal to the target engine speed NE* for a smaller state of charge SOC. Thus, when the regenerative power of the second motor generator 54 is small, the engine speed NE is higher than when the regenerative power of the second motor generator 54 is large. This limits fluctuation of the deceleration force that would result from differences in the regenerative power.

(4) When the permitted FC time Tfc is less than or equal to the threshold value Tth, the CPU 72 selects the protection map data and notifies the driver of the selection regardless of whether the fuel cutoff process is currently performed. This ensures that the driver will be notified in advance of deceleration when operating the accelerator.

(5) In the protection map data, deceleration in the B-position is greater than deceleration in the D-position. Thus, even when the protection map data is selected, the driver will notice a difference in deceleration resulting from the shift position.

Second Embodiment

A second embodiment will now be described with reference to the drawings focusing on differences from the first embodiment.

In the present embodiment, a process that gradually increases the driving force is performed when the protection flag F1 is switched from 0 to 1 during deceleration.

Figure 6:
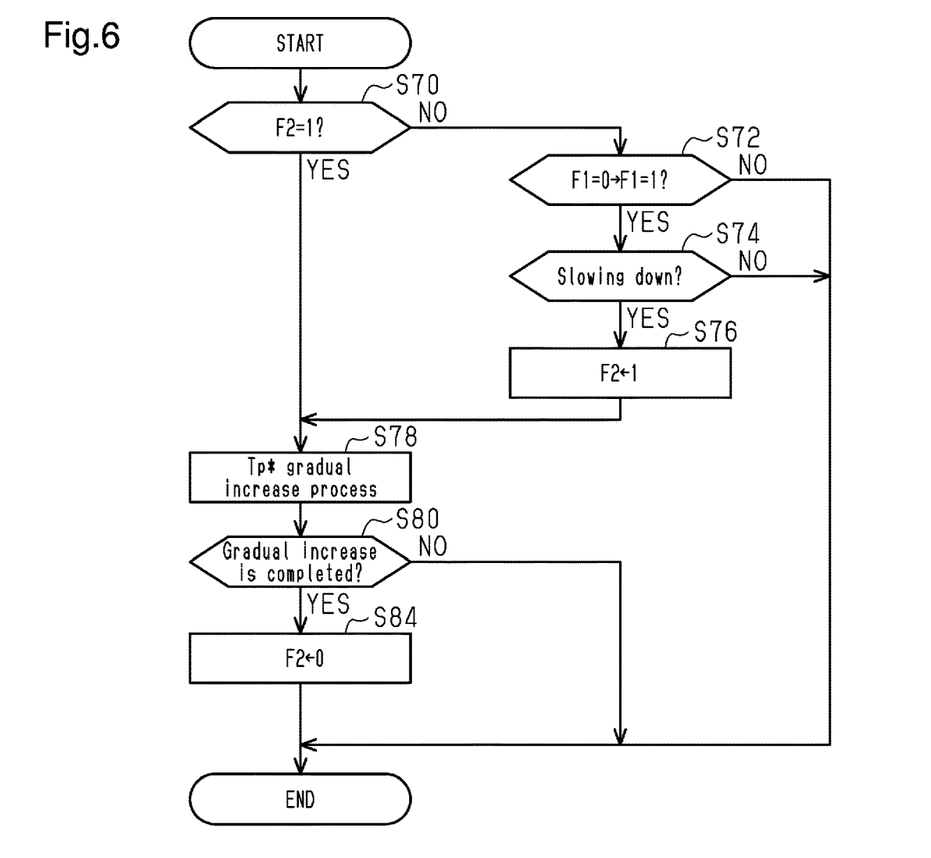
FIG. 6 is a flowchart showing the procedure of processes executed by the controller according to a second embodiment.

FIG. 6 shows the procedure of the process. The CPU 72 repeatedly executes a program stored in the ROM 74 in, for example, predetermined cycles to perform the processing illustrated in FIG. 6.

In the series of processes shown in FIG. 6, the CPU 72 determines whether a gradating flag F2 is 1 (S70). When the gradating flag F2 is 1, a process that gradually increases driving force to an achievable value with the protection map is being executed. When the gradating flag F2 is 0, the above process that gradually increases the driving force is not being executed.

When determining that the gradating flag F2 is 0 (S70: NO), the CPU 72 determines whether the protection flag F1 switches from 0 to 1 (S72). When determining that the protection flag F1 switches to 1 (S72: YES), the CPU 72 determines whether the vehicle VC is slowing down (S74). When determining that the vehicle VC is slowing down (S74: YES), the CPU 72 sets the gradating flag F2 to 1 (S76).

When determining that the gradating flag F2 is 1 (S70: YES) or completing the process of S76, the CPU 72 gradually increases the required drive torque Tp* (S78). The CPU 72 determines whether the gradual increase process is completed (S80). The CPU 72 determines that the gradual increase process is completed when the required drive torque Tp* is a value that can be achieved with the protection map.

When determining that the gradual increase process is completed (S80: YES), the CPU 72 sets the gradating flag F2 to 0 (S84).

The CPU 72 ends the processing illustrated in FIG. 6 when completing the process of S84 or when making a negative determination in the process of S72, S74, or S80.

Operation and Advantages of the Second Embodiment

Figure 7:
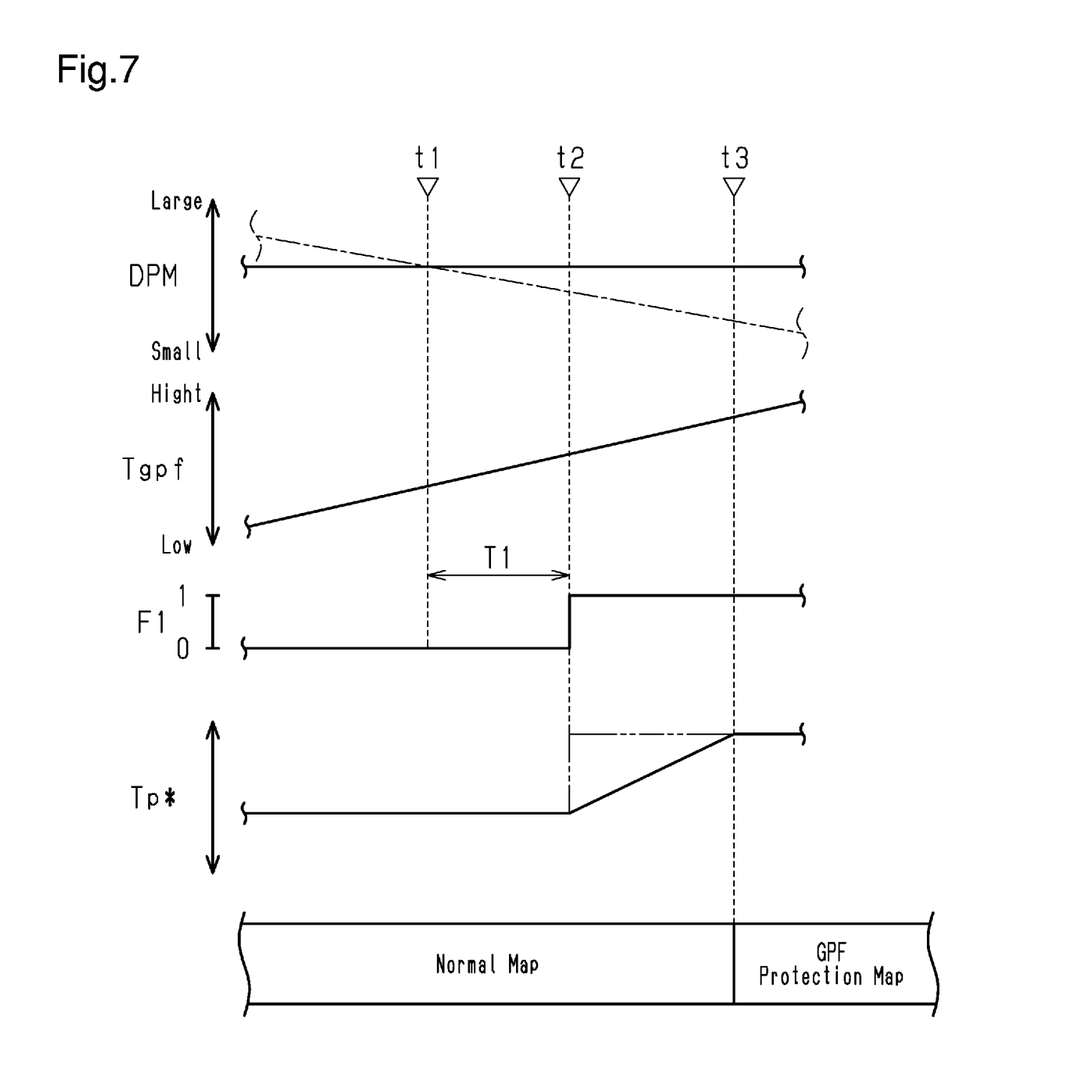
FIG. 7 is a time chart showing an operation of the second embodiment.

FIG. 7 shows a processing example when the protection flag F1 is switched from 0 to 1 during deceleration. The long-dash short-dash line in FIG. 7 indicates the threshold value of the PM deposition amount DPM when the PM deposition amount DPM is for a case in which the permitted FC time Tfc is less than or equal to the threshold value Tth.

As shown in FIG. 7, when the permitted FC time Tfc becomes less than or equal to the threshold value Tth at time t1 and a predetermined time T1 elapses at time t2 from time t1, the CPU 72 switches the protection flag F1 from 0 to 1. Then, the CPU 72 gradually increases the required drive torque Tp* as shown by the solid line in FIG. 7. At time t3 at which the required drive torque Tp* is a value that can be achieved with the protection map, the CPU 72 switches the map used to calculate the required drive torque Tp* from the normal map to the protection map.

Correspondence

Correspondence to the features in the embodiments is described for each aspect in the SUMMARY.

(1, 7) The rotating electrical machine corresponds to the second motor generator 54. The filter corresponds to the GPF 34. The first deceleration control process corresponds to the processes in S36, S38 to S56, and S60 to S66 when the required drive torque Tp* is negative. The second deceleration control process corresponds to the processes in S34, S38 to S56, and S60 to S66 when the required drive torque Tp* is negative. The fuel cutoff process corresponds to the process that can be performed in S36. The selection process corresponds to the processes shown in FIG. 2. The threshold value corresponds to the threshold values Dα and Dβ.

(2) The threshold value Dα is less than the threshold value Dβ.

(3) The gear ratio adjuster corresponds to the planetary gear mechanism 50 and the first motor generator 52. The electric storage device corresponds to the battery 59.

(4) The notification process corresponds to the process of S22.

(5) The gradating process corresponds to the process of S78.

(6) In FIG. 2, a case in which the process of S26 is performed corresponds to a case in which the process of S29 is not performed unless the trip ends.

OTHER EMBODIMENTS

The present embodiment may be modified as follows. The above-described embodiment and the following modifications can be combined as long as the combined modifications remain technically consistent with each other.

First Deceleration Control Process

The first deceleration control process does not need to include the processes of S36, S38 to S56, and S60 to S66. The first deceleration control process may generate braking force through only the fuel cutoff process. In other words, the first deceleration control process may cause deceleration using only the load torque of the internal combustion engine 10 instead of performing regenerative control with the rotating electrical machine while also using the load torque resulting from a fuel cutoff process.

Second Deceleration Control Process

The second deceleration control process does not need to perform rotation speed control on the first motor generator 52 to decelerate. For example, as described below in the section referring to gear ratio adjuster, when a vehicle includes a multi-speed transmission, the gear ratio of the multi-speed transmission may be adjusted to decelerate. In this case, when the regenerative power of the second motor generator 54 is small, the gear ratio is adjusted to further increase the engine speed NE.

The second deceleration control process does not need to generate desired braking force in cooperation with the regenerative power of the rotating electrical machine. For example, the desired braking force may be generated with only the power of the internal combustion engine 10. In other words, the second deceleration control process may cause deceleration using only the load torque of the internal combustion engine 10 instead of performing regenerative control with the rotating electrical machine while also using the load torque of the internal combustion engine 10.

The required drive torque Tp* does not need to differ in value between the B-position and the D-position.

Selection Process

The selection process does not need to select the first deceleration control process or the second deceleration control process in accordance with whether the permitted FC time Tfc is less than or equal to the threshold value Tth. Instead, the CPU 72 may determine whether the PM deposition amount DPM is greater than or equal to a threshold value. In this case, the CPU 72 may variably set the threshold value from the temperature Tgpf. The CPU 72 does not need to perform the variable setting of the threshold value.

Execution Periods of First Deceleration Control Process and Second Deceleration Control Process In the above embodiment, when the protection flag F1 is set to 1, the protection flag F1 is not set to 0 during a trip. In other words, once the second deceleration control process is selected, the first deceleration control process is not selected during a trip. Instead, when the permitted FC time Tfc continues to be greater than the threshold value Tth for a specified time or longer, the protection flag F1 may be set to 0.

In the above embodiment, the protection flag F1 switches from 0 to 1 during a trip. Instead, the process of FIG. 2 may be performed only at the start and the end of a trip. In other words, the process that selects the first deceleration control process or the second deceleration control process may be performed only at the start of a trip.

Gear Ratio Adjuster

The gear ratio adjuster does not need to include the planetary gear mechanism 50 and the first motor generator 52. Instead, the gear ratio adjuster may be a transmission such as a multi-speed transmission or the like that changes a gear ratio by changing the engaged gears.

Hybrid Electric Vehicle

A hybrid electric vehicle does not need to be a series-parallel hybrid electric vehicle. Instead, the hybrid electric vehicle may be a parallel hybrid electric vehicle.

The controller 70 does not need to include the CPU 72 and the ROM 74 and execute software processing. For example, a dedicated hardware circuit (such as ASIC) may be provided that executes at least part of the software processes executed in the above-described embodiment. That is, the controller 70 may be modified to have any one of the following configurations (a) to (c). (a) A configuration including a processor that executes all of the above-described processes according to programs and a program storage device such as ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software executing devices each including a processor and a program storage device and a plurality of dedicated hardware circuits may be provided. That is, the above processes may be executed by processing circuitry that includes at least one of a set of one or more software executing devices or a set of one or more dedicated hardware circuits. The program storage device, or computer readable media, includes any type of media accessible by general-purpose computers and dedicated computers.

An Exemplary Embodiment

A deceleration controller applied to a vehicle including an internal combustion engine and a gear ratio adjuster, where the internal combustion engine includes a filter arranged in an exhaust passage to collect particulate matter from exhaust gas, a crankshaft of the internal combustion engine is configured to be mechanically coupled to a drive wheel by the gear ratio adjuster, the gear ratio adjuster is a device that adjusts a ratio of a rotation speed of the crankshaft to a rotation speed of the drive wheel, the deceleration controller executes a deceleration control process, an estimation process, and a restriction process, the deceleration control process controls deceleration of the vehicle by operating the gear ratio adjuster when the vehicle is required to decelerate, the deceleration control process when at least the restriction process is not executed includes a fuel cutoff process, the fuel cutoff process stops supplying fuel to a cylinder of the internal combustion engine, the estimation process estimates whether a temperature of the filter will increase beyond a permissible range in accordance with an amount of particulate matter deposited on the filter when the fuel cutoff process is executed to cause deceleration as required, and the restriction process restricts the deceleration of the vehicle that is of a small extent if the vehicle is required to decelerate when the estimation process estimates that the temperature will increase.

When a fuel cutoff process is being executed, deceleration increases as the rotation speed of the crankshaft of the internal combustion engine relative to the rotation speed of the drive wheel increases. However, the fuel cutoff process will result in a large amount of oxygen flowing into the filter and cause the temperature of the filter to rise easily. In particular, if the rotation speed is high when a filter process is being executed, the amount of oxygen flowing into the filter per unit time will be greater than that when the rotation speed is low. Thus, the oxidization heat generated by particulate matter deposited on the filter will cause the temperature of the filter to become excessively high. With the above configuration, when it is estimated that the temperature of the filter will increase beyond the permissible range, deceleration is restricted to occur over a small extent. This reduces the amount of oxygen flowing into the filter so that the temperature of the filter will not increase excessively.

Deceleration Control Process in Above Exemplary Embodiment

Different maps do not need to be used for different shift positions. For example, the same map may be used for the D-position and the B-position. In this case, the minimum drive torque that is obtained when combustion control of the internal combustion engine 10 is being executed may be the minimum value of the drive torque.

The deceleration control process does not need to restrict the minimum value of the drive torque for each position so that the minimum value is set to a greater value. In other words, the deceleration control process does not need to restrict the maximum value of the deceleration torque for each position so that the maximum value is set to a smaller value. For example, the deceleration control process may prohibit processing, particularly, in a position such as the B-position in which the drive torque becomes small.

The deceleration control process does not need to apply negative drive torque to the drive wheels 60 while executing combustion control of the internal combustion engine 10. For example, the engine speed NE may be restricted and set to a smaller value. This also reduces the amount of oxygen entering the GPF 34 per unit time.

Estimation Process in the Above Exemplary Embodiment

The estimation process does not need to be based on the present temperature Tgpf and the present PM deposition amount DPM. For example, when the notification process is executed before the vehicle VC starts traveling as described below in the notification process section, the estimation process may determine whether the permitted FC time Tfc is less than or equal to the threshold value Tth before the vehicle VC starts traveling. In this case, the permitted FC time Tfc may be calculated using only the PM deposition amount DPM as an input. Alternatively, the permitted FC time Tfc may be calculated using the PM deposition amount DPM and the temperature of the internal combustion engine 10 when the engine is started as inputs. Further, when the destination of the vehicle VC has been set, variables indicating the route to the destination may be included in the inputs. In this case, in contrast with when there are many downhills, when the route to the destination is entirely in an urban area, it may be determined that the permitted FC time Tfc is less than or equal to the threshold value Tth when the PM deposition amount DPM increases.

Notification Process in the Above Exemplary Embodiment

FIG. 3 shows an example in which restricted deceleration is notified when the vehicle VC is traveling. Instead, the notification process may be executed only before the vehicle VC starts traveling. Specifically, the notification process may be executed when a system main relay that connects the first inverter 56, the second inverter 58, and the battery 59 closes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a hybrid electric vehicle including an internal combustion engine and a rotating electrical machine, wherein the internal combustion engine includes a filter arranged in an exhaust passage and configured to collect particulate matter from exhaust gas, the controller comprising:

processing circuitry, wherein
the processing circuitry is configured to execute a first deceleration control process, a second deceleration control process, and a selection process,
the first deceleration control process uses a fuel cutoff process when deceleration of the hybrid electric vehicle is required,
the fuel cutoff process stops combustion control of fuel in a cylinder of the internal combustion engine,
the second deceleration control process does not use the fuel cutoff process when deceleration of the hybrid electric vehicle is required,
the selection process selects execution of the second deceleration control process when a particulate matter (PM) deposition amount is greater than or equal to a threshold value and selects execution of the first deceleration control process when the PM deposition amount is less than the threshold value,
the PM deposition amount is an amount of particulate matter deposited on the filter, and
wherein the processing circuitry is further configured to execute a gradating process, and when the PM deposition amount is greater than or equal to the threshold value during execution of the first deceleration control process, before switching to the second deceleration control process, the gradating process in the first deceleration control process gradually shifts deceleration that is achievable in the second deceleration control process.

2. The controller according to claim 1, wherein the selection process includes a process that variably sets the threshold value in accordance with a temperature of the filter, and the threshold value that is set when the temperature of the filter is above a predetermined temperature is less than or equal to the threshold value that is set when the temperature of the filter is below the predetermined temperature.

3. The controller according to claim 1, wherein the hybrid electric vehicle includes a gear ratio adjuster and an electric storage device, a crankshaft of the internal combustion engine is configured to be mechanically coupled to a drive wheel by the gear ratio adjuster, the gear ratio adjuster is configured to adjust a ratio of a rotation speed of the crankshaft to a rotation speed of the drive wheel, the electric storage device is configured to be charged with regenerative power of the rotating electrical machine, the second deceleration control process includes a process that sets the regenerative power and an engine speed in accordance with a state of charge of the electric storage device, the regenerative power that is set when the state of charge of the electric storage device is above a predetermined charge is less than or equal to the regenerative power that is set when the state of charge is below the predetermined charge, and the engine speed that is set when the state of charge of the electric storage device is large is greater than or equal to the engine speed that is set when the state of charge is small.

4. The controller according to claim 1, wherein the processing circuitry is configured to execute a notification process, and the notification process notifies a user that deceleration will be restricted prior to execution of the second deceleration control process.

5. The controller according to claim 1, wherein the processing circuitry is configured to execute the second deceleration control process when deceleration of the hybrid electric vehicle is required even when the PM deposition amount is less than the threshold value if there is a history of the second deceleration control process having been executed in a single trip.

6. A method for controlling a hybrid electric vehicle including an internal combustion engine and a rotating electrical machine, wherein the internal combustion engine includes a filter arranged in an exhaust passage and configured to collect particulate matter from exhaust gas, the method comprising:
  executing a first deceleration control process, a second deceleration control process, and a selection process, wherein
  the first deceleration control process uses a fuel cutoff process when deceleration of the hybrid electric vehicle is required,
  the fuel cutoff process stops combustion control of fuel in a cylinder of the internal combustion engine,
  the second deceleration control process does not use the fuel cutoff process when deceleration of the hybrid electric vehicle is required,
  the selection process selects execution of the second deceleration control process when a particulate matter (PM) deposition amount is greater than or equal to a threshold value and selects execution of the first deceleration control process when the PM deposition amount is less than the threshold value,
  the PM deposition amount is an amount of particulate matter deposited on the filter, and
  when the PM deposition amount is greater than or equal to the threshold value during execution of the first deceleration control process, before switching to the second deceleration control process, a gradating process in the first deceleration control process gradually shifts deceleration that is achievable in the second deceleration control process.

7. A controller for a hybrid electric vehicle including an internal combustion engine and a rotating electrical machine, wherein the internal combustion engine includes a filter arranged in an exhaust passage and configured to collect particulate matter from exhaust gas, the controller comprising:
  processing circuitry, wherein
  the processing circuitry is configured to execute a first deceleration control process, a second deceleration control process, and a selection process,
  the first deceleration control process uses a fuel cutoff process when deceleration of the hybrid electric vehicle is required,
  the fuel cutoff process stops combustion control of fuel in a cylinder of the internal combustion engine,
  the second deceleration control process does not use the fuel cutoff process when deceleration of the hybrid electric vehicle is required,
  the selection process selects execution of the second deceleration control process when a particulate matter (PM) deposition amount is greater than or equal to a threshold value and selects execution of the first deceleration control process when the PM deposition amount is less than the threshold value, and
  the PM deposition amount is an amount of particulate matter deposited on the filter,
  wherein the processing circuitry is further configured to execute the second deceleration control process when deceleration of the hybrid electric vehicle is required even when the PM deposition amount is less than the threshold value if there is a history of the second deceleration control process having been executed in a single trip.

* * * * *